May 21, 1968  F. G. NEUBECK  3,384,326
AERODYNAMIC STRAKE
Filed Aug. 24, 1965
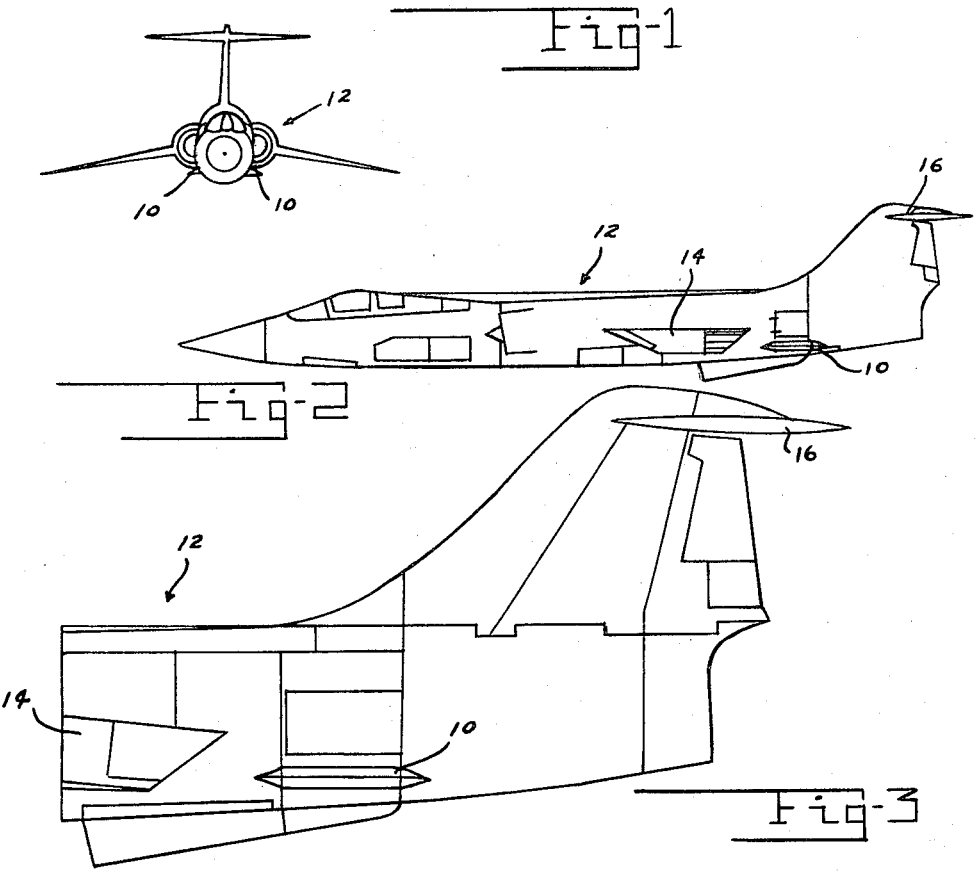
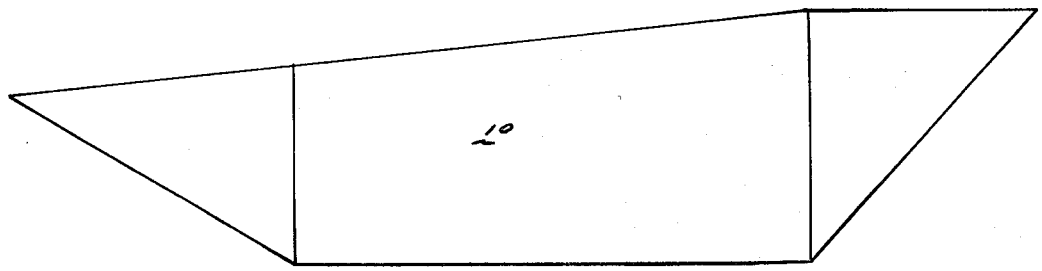
INVENTOR
FRANCIS G. NEUBECK
BY Harry A. Herbert Jr. and
Louis E. 
ATTORNEYS

United States Patent Office 3,384,326
Patented May 21, 1968

3,384,326
AERODYNAMIC STRAKE
Francis G. Neubeck, Eglin Air Force Base, Fla.
(9467 Somerset Lane, Cypress, Calif. 90630)
Filed Aug. 24, 1965, Ser. No. 482,304
1 Claim. (Cl. 244—13)

ABSTRACT OF THE DISCLOSURE

An elongated aerodynamic strake for use on an airplane, and being in the form of a pentahedral prominence in plan and joined to and extending from each lower quarter aft section of the fuselage between the trailing edge of the wing and the leading edge of the horizontal stabilizer to be in the upwash area for improving overall stability and flight characteristics of the airplane.

---

The invention described herein may be manufactured and used by or for the Government for governmental purposes without the payment to me of any royalty thereon.

This invention relates to airplanes in general, and more specifically to low aspect ratio, high tail, supersonic airplanes. An example, of such an airplane is the Air Force F–104 supersonic fighter.

Aircraft are designed for optimum performance at specified flight parameters. In order to achieve these objectives the resulting airframe is often such that it will have undesirable flight characteristics or restrictive capabilities in other areas of its flight envelope. Military intelligence organizations of each nation devote considerable effort in evaluating a potential enemy's armament in order to determine its favorable characteristics which must be avoided and its weaknesses which must be capitalized on to insure a successful engagement.

The invention to be disclosed provides a means of both improving the flight characteristics and expanding the flight envelope of the type of aircraft to which it relates. Actual flight test has confirmed the value of the invention in increasing the maneuverability envelope and the stability characteristics with a negligible degradation of the performance capability of the aircraft in other areas of the flight envelope.

The invention has also been found to produce a marked increase in directional stability which in turn results in improved handling characteristics throughout the complete flight envelope. The attainment of this increased directional stability is equally as important at the high-speed end of the flight envelope as at the low-speed end. As is well known, satisfactory directional stability requirements are critical at very high mach numbers, and by virtue of the strake projection in the vertical plane, a significant increase in directional stability is realized in this high-speed regime.

One object of the present invention is to improve the flight stability of a high-speed airplane when operating in a low-speed regime.

A further object of the present invention is to stabilize the flight of a high-speed military aircraft when operating in a low-speed regime in order to improve the accuracy of its armament.

Another object of the persent invention is to improve the control sensitivity of a high-speed airplane when operating in a low-speed regime.

Yet another object of the present invention is to attain an increase in the directional stability of an airplane in order to achieve improved handling characteristics throughout the complete flight envelope.

Additional objects, advantages and features of the invention reside in the construction, arrangement and combination of parts involved in the embodiment of the invention as will appear from the following description and accompanying drawings, wherein:

FIG. 1 is a front elevation of the airplane showing the angular relationship of the strakes in relation to the vertical axis of the airplane;

FIG. 2 is a side elevation of the airplane showing the longitudinal position of a strake;

FIG. 3 is an enlarged view of the rear portion of FIG. 2, and showing with greater clarity the relationship between the aerodynamic strake and well-known airplane elements; and FIG. 4 is an enlarged plan view of the strake only.

The aerodynamic strake 10, constituting this invention, is joined to the exterior of the fuselage skin on airplane 12, as shown on FIG. 1, FIG. 2 and FIG. 3. One strake is joined to each side of the airplane, the positions being symmetrical in both longitude and in the angular location in respect to the vertical axis of the airplane.

The strakes may be described as auxiliary horizontal tail surfaces located at the aft fuselage. The particular configuration shown may be described as a pentahedral prominence. This configuration was established as the result of an extensive test program to determine the reason for the unfavorable flight characteristic of the air plane.

The strakes are installed at the lower aft fuselage section to be about 30° below the horizontal plane transverse to the longitudinal axis of the fuselage as shown on FIG. 1, and are longitudinally installed on the fuselage to be in the area between the wing 14 and the horizontal stabilizer 16. On the particular airplane used, the longitudinal axis of each strake was at substantially 4° angle of attack, or angle of incidence with respect to the longitudinal axis of the fuselage. This location was found to effectively delay the pitch-up tendency of the airplane at certain subsonic flight conditions.

Whether or not strakes are required, and if so, their exact location will vary between various designs of airplanes and in their contemplated mode of operation. The exact location can only be determined by actual flight test; it being necessary to counterbalance the forces causing the flight instability. In general, the strakes are located at each side of the fuselage in the lower quadrant of the aft section so as to be laterally located between the trailing edge of the adjacent wing and the leading edge of the adjacent horizontal stabilizer so as to be acting in an area of upward flowing air at the higher angles of attack, which acting against the lower surface of the strakes produces a counter-balancing moment to compensate and delay the unbalancing forces acting on the airplane. In addition, the angular attachment of the strakes provides improvements in directional and lateral stability which retains tracking effectiveness in the limits of an expanded flight envelope.

The strakes may be made in any convenient form which is suitable for the objectives of the devices, and which does not adversely influence the operation of the airplane. The strake as depicted is a sheet metal "boat" structure having its broad open side adjacent to and joined to the fuselage. The two side members converge into an outer edge opposite the open side against the fuselage; the lower side member forming the air foil against which the upward flowing air acts. Both ends of the strake are pointed or beveled to provide streamlined leading and trailing edges.

The angular attachment provides a projection in the vertical plane which is responsible for the aforementioned increase in directional stability. Whereas the horizontal projection attains the required counterbalancing moments required to delay the longitudinal instability experienced in this aircraft. Both features are important in attainment of an effective envelope expansion.

I claim:

1. In combination an airplane having a fuselage, a horizontal stabilizer extending from the rear of the fuselage and wings laterally extending from the fuselage to be forward of the horizontal stabilizer, and two elongated aerodynamic strakes one each of which is symmetrically and longitudinally joined onto opposite sides of the fuselage to laterally extend from the lower aft section of the fuselage, said strakes being of pentahedral form in plan and longitudinally located on the fuselage between the trailing edge of the wings and the horizontal stabilizer so as to be in the upwash area between the wings and the horizontal stabilizer at the higher angles of attack, the aerodynamic starkes providing auxiliary tail surfaces for improving the overall stability and the flight characteristics of the airplane at the low flight speed regime.

References Cited

UNITED STATES PATENTS

| | | | |
|---|---|---|---|
| 2,960,286 | 11/1960 | Louthan | 244—91 |
| 2,999,657 | 9/1961 | Clark | 244—91 |

FOREIGN PATENTS

| | | |
|---|---|---|
| 425,645 | 3/1935 | Great Britain. |

MILTON BUCHLER, *Primary Examiner.*

FERGUS S. MIDDLETON, *Examiner.*

A. E. CORRIGAN, T. W. BUCKMAN,
*Assistant Examiners.*